(12) United States Patent
Takeda et al.

(10) Patent No.: US 11,601,964 B2
(45) Date of Patent: Mar. 7, 2023

(54) USER TERMINAL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/053,988

(22) PCT Filed: May 10, 2018

(86) PCT No.: PCT/JP2018/018144
§ 371 (c)(1),
(2) Date: Nov. 9, 2020

(87) PCT Pub. No.: WO2019/215876
PCT Pub. Date: Nov. 14, 2019

(65) Prior Publication Data
US 2021/0274534 A1 Sep. 2, 2021

(51) Int. Cl.
*H04W 72/12* (2009.01)
*H04W 76/11* (2018.01)
*H04L 1/00* (2006.01)
*H04W 72/044* (2023.01)

(52) U.S. Cl.
CPC ....... *H04W 72/1289* (2013.01); *H04L 1/0061* (2013.01); *H04W 72/0466* (2013.01); *H04W 72/1257* (2013.01); *H04W 76/11* (2018.02)

(58) Field of Classification Search
CPC ... H04W 48/12; H04W 52/0216; H04W 4/70; H04W 72/042; H04W 76/27; H04W 88/02; H04W 24/10; H04L 1/0061; H04L 5/0098; H04L 5/0078; H04L 5/0053; H04L 69/324
USPC .................. 370/328, 329, 330, 331
See application file for complete search history.

(56) References Cited

U.S. PATENT DOCUMENTS

| 10,039,089 B2 * | 7/2018 | Suzuki | H04L 1/1835 |
| 2015/0189639 A1 * | 7/2015 | Zhang | H04L 1/0028 370/330 |
| 2017/0041904 A1 | 2/2017 | Suzuki et al. | |
| 2018/0324016 A1 * | 11/2018 | Ji | H04L 5/1469 |

(Continued)

FOREIGN PATENT DOCUMENTS

| WO | 2015/079971 A1 | 6/2015 | |
| WO | WO-2015079971 A1 * | 6/2015 | H04L 5/1469 |
| WO | WO-2019140663 A1 * | 7/2019 | H04L 1/1678 |

OTHER PUBLICATIONS

International Search Report issued in PCT/JP2018/018144 dated Jul. 31, 2018 (2 pages).

(Continued)

*Primary Examiner* — David Q Nguyen
(74) *Attorney, Agent, or Firm* — Osha Bergman Watanabe & Burton LLP

(57) ABSTRACT

A user terminal according to one aspect of the present disclosure includes: a receiving section that receives configuration information of a cell group; and a control section that controls monitoring of downlink control information (DCI) including cyclic redundancy check (CRC) bits scrambled by a certain identifier included in the configuration information in a search space configured in a cell in the cell group.

6 Claims, 14 Drawing Sheets

(56) References Cited

U.S. PATENT DOCUMENTS

| | | | | |
|---|---|---|---|---|
| 2019/0207705 | A1* | 7/2019 | Zhou | H04W 52/146 |
| 2019/0207737 | A1* | 7/2019 | Babaei | H04B 7/0626 |
| 2019/0208507 | A1* | 7/2019 | Xiong | H04L 5/0078 |
| 2019/0215900 | A1* | 7/2019 | Pan | H04L 27/2666 |
| 2019/0222349 | A1* | 7/2019 | Gao | H04W 72/0406 |
| 2019/0222357 | A1* | 7/2019 | Huang | H04L 1/1614 |
| 2019/0246421 | A1* | 8/2019 | Zhou | H04W 72/14 |
| 2019/0254073 | A1* | 8/2019 | Sheng | H04L 1/0063 |
| 2019/0320457 | A1* | 10/2019 | Maaref | H04W 76/27 |
| 2020/0044782 | A1* | 2/2020 | Vaidya | H04W 72/1289 |
| 2020/0146032 | A1* | 5/2020 | Bae | H04W 80/08 |
| 2021/0392630 | A1* | 12/2021 | Ying | H04W 72/042 |

OTHER PUBLICATIONS

Written Opinion of the International Searching Authority issued in PCT/JP2018/018144 dated Jul. 31, 2018 (4 pages).
Fujitsu; Frequency domain field interpretation for fallback DCI in DL; 3GPP TSG RAN WG1 Meeting #92bis, R1-1803941; Sanya, China; Apr. 16-20, 2018 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report in counterpart European Application No. 18 91 8025.0 dated Nov. 25, 2021 (11 pages).
Huawei; "Outcome of email discussion [NR-AH1801#21][NR] 38.311 ASN.1 review part 3—L2 params (Huawei)" 3GPP TSG-RAN WG2 Meeting #101, R2-1803479; Athens, Greece; Feb. 26-Mar. 2, 2018 (243 pages).
Samsung "Draft CR to TS 38.213 capturing the RAN1#92bis meeting agreements"; 3GPP TSG-RAN1 WG2 Meeting #92bis, R1-1805776; Sanya, China; Apr. 16-20, 2018 (80 pages).
Huawei et al; "TP to correct L1 parameters for CSI-RS configuration"; 3GPP TSG-RAN WG2 Meeting #101 bis, R2-1806228; Sanya, China; Apr. 16-20, 2018 (161 pages).
Office Action issued in the counterpart Japanese Patent Application No. 2020-517704, dated Jul. 5, 2022 (7 pages).
3GPP TS 38.213 V15.1.0; "3rd Generation Partnership Project; Technical Specification Group Radio Access Network; NR; Physical layer procedures for control (Release 15)"; Mar. 2018 (77 pages).

* cited by examiner

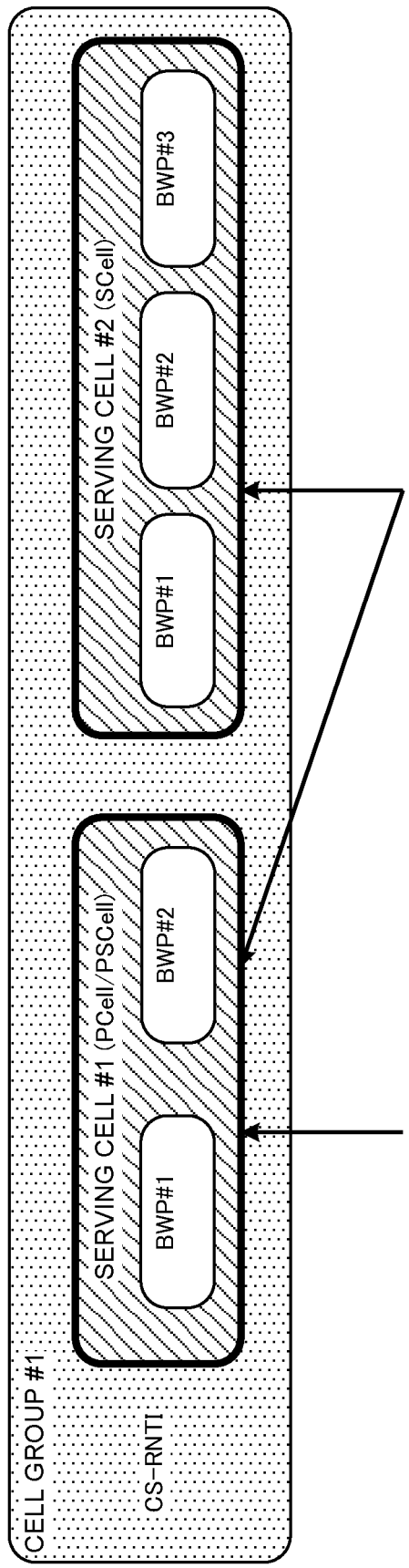
FIG. 3

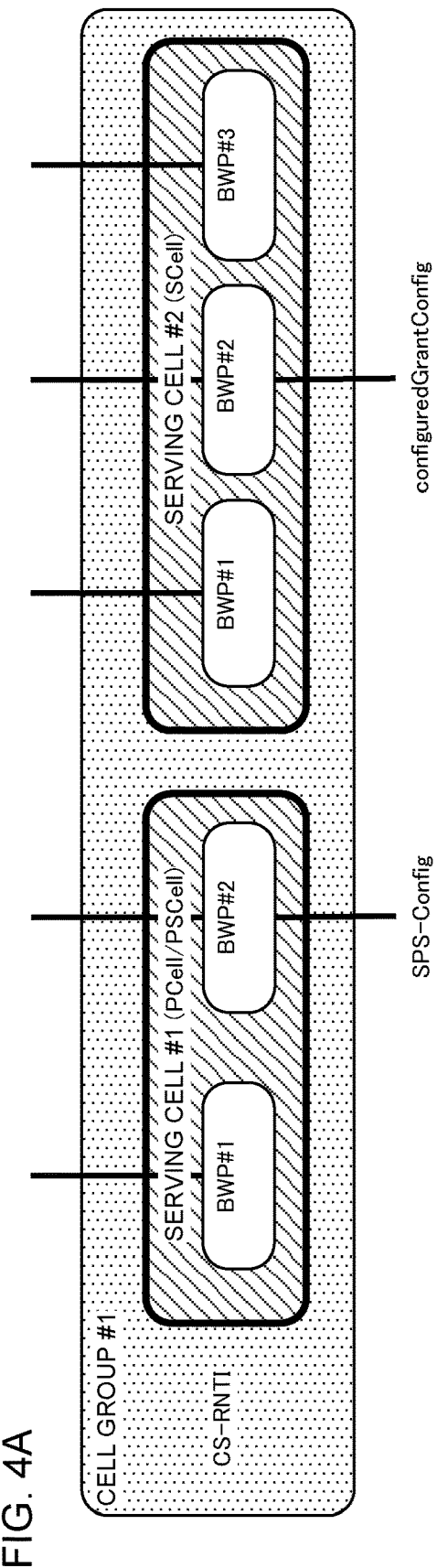 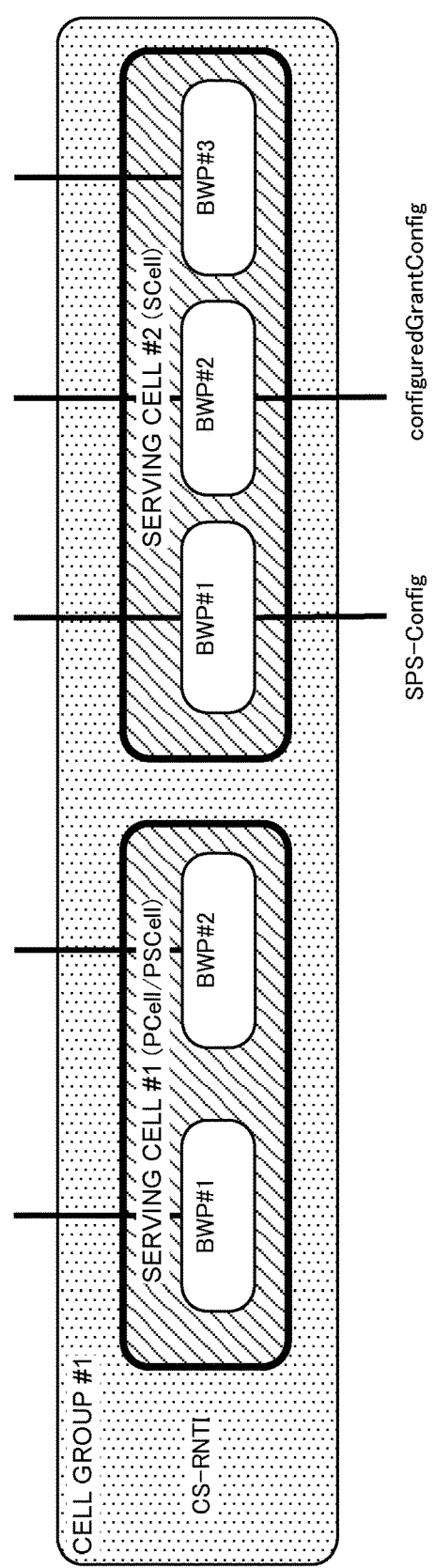
FIG. 4A
FIG. 4B

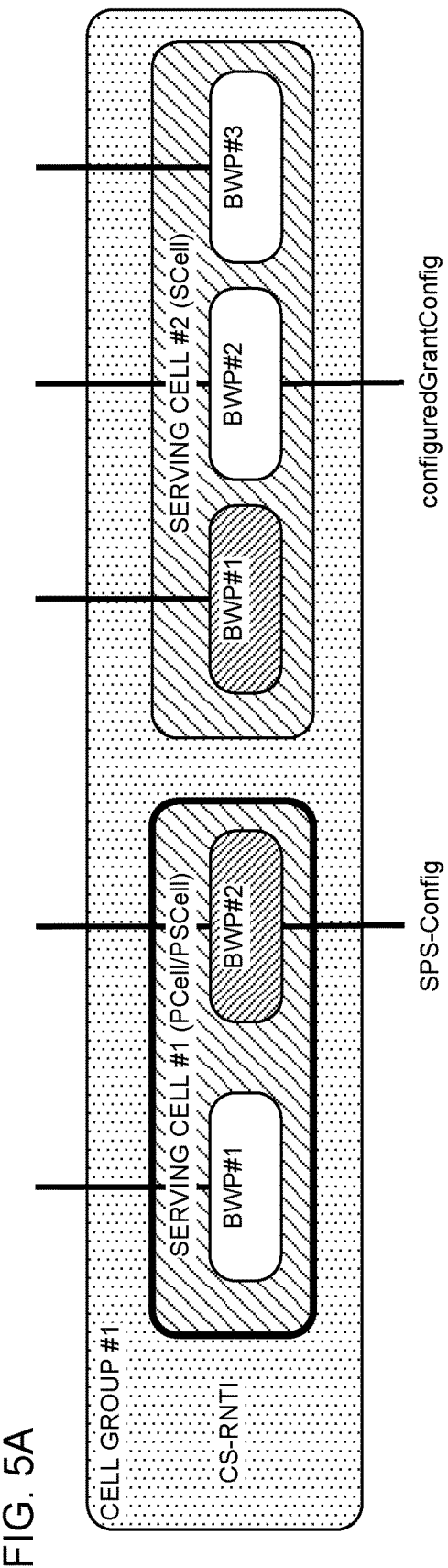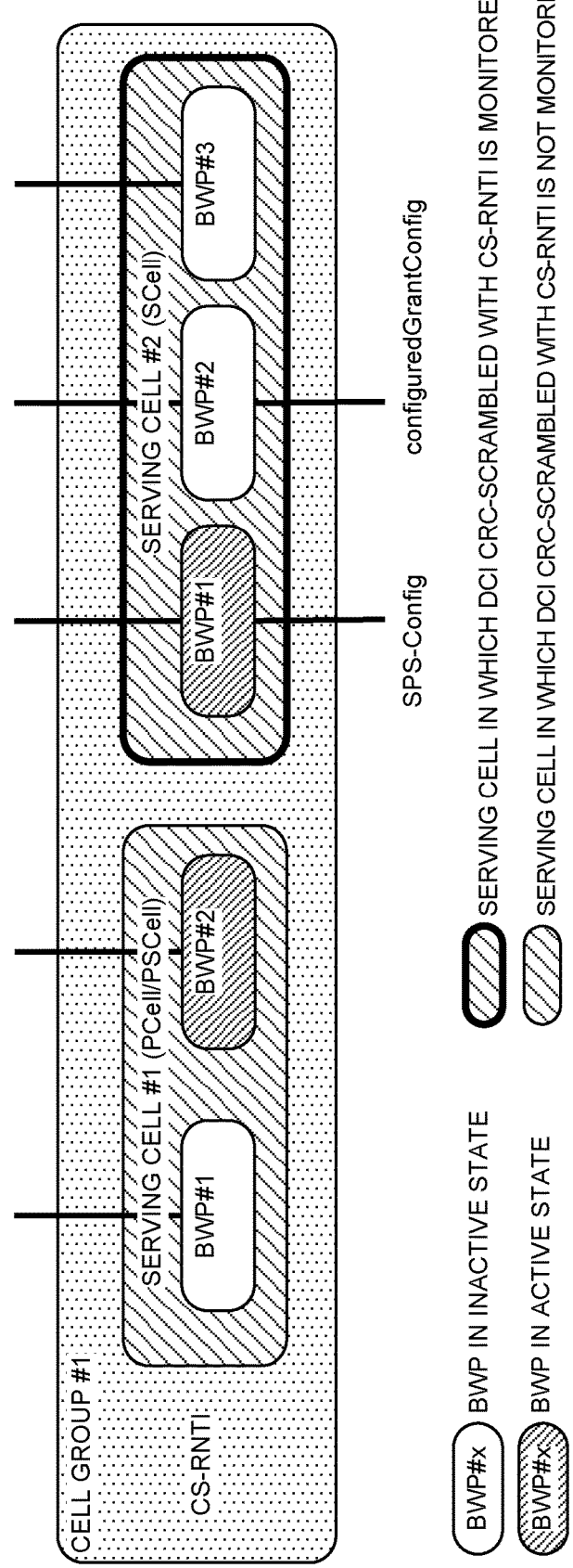

US 11,601,964 B2

USER TERMINAL

TECHNICAL FIELD

The present disclosure relates to a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 14), a radio base station (for example, an eNB (eNode B)) transmits a control signal of a physical layer (for example, downlink control information (DCI)) to a user terminal (UE (User Equipment)) by using a control channel (for example, a PDCCH (Physical Downlink Control Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the existing LTE systems (for example, LTE Rel. 8 to Rel. 14), a common search space (CSS) is provided in a specific cell (for example, a primary cell (also referred to as a PCell, a P cell, and so on) or a primary secondary cell (also referred to as a PSCell, an S cell, and so on)) in a cell group, but is not provided in other cells (also referred to as, for example, a secondary cell (SCell), an S cell, and so on) in the cell group. A user-specific search space (USS) may be provided in any cell in the cell group.

In contrast, in future radio communication systems (for example, NR, 5G, 5G+, or Rel. 15 or later versions), it is assumed that the CSS is provided in the SCell as well as in the PCell or the PSCell. The USS may be provided in any cell in the cell group. For this reason, how to control monitoring of downlink control information (DCI) in a search space (at least one of the CSS and the USS) configured in the cells of the cell group is a problem.

The present invention is made in the light of such circumstances as described above, and has an object to provide a user terminal capable of appropriately controlling monitoring of DCI in a search space configured in a cell in a cell group.

Solution to Problem

A user terminal according to one aspect of the present disclosure includes: a receiving section that receives configuration information of a cell group; and a control section that controls monitoring of downlink control information (DCI) including cyclic redundancy check (CRC) bits scrambled by a certain identifier included in the configuration information in a search space configured in a cell in the cell group.

Advantageous Effects of Invention

According to one aspect of the present disclosure, monitoring of DCI in a search space configured in a cell in a cell group can be appropriately controlled.

BRIEF DESCRIPTION OF DRAWINGS

FIG. 3 is a diagram to show an example of monitoring control of DCI CRC-scrambled by a CS-RNTI according to a modified example of the first aspect;

FIGS. 4A and 4B are each a diagram to show an example of a DL BWP and a serving cell in which DCI CRC-scrambled by a CS-RNTI is monitored even though neither SPS-Config nor configuredGrantConfig is configured;

FIGS. 5A and 5B are each a diagram to show an example of monitoring control of DCI CRC-scrambled by a CS-RNTI according to a second aspect;

DESCRIPTION OF EMBODIMENTS

Figure 1:
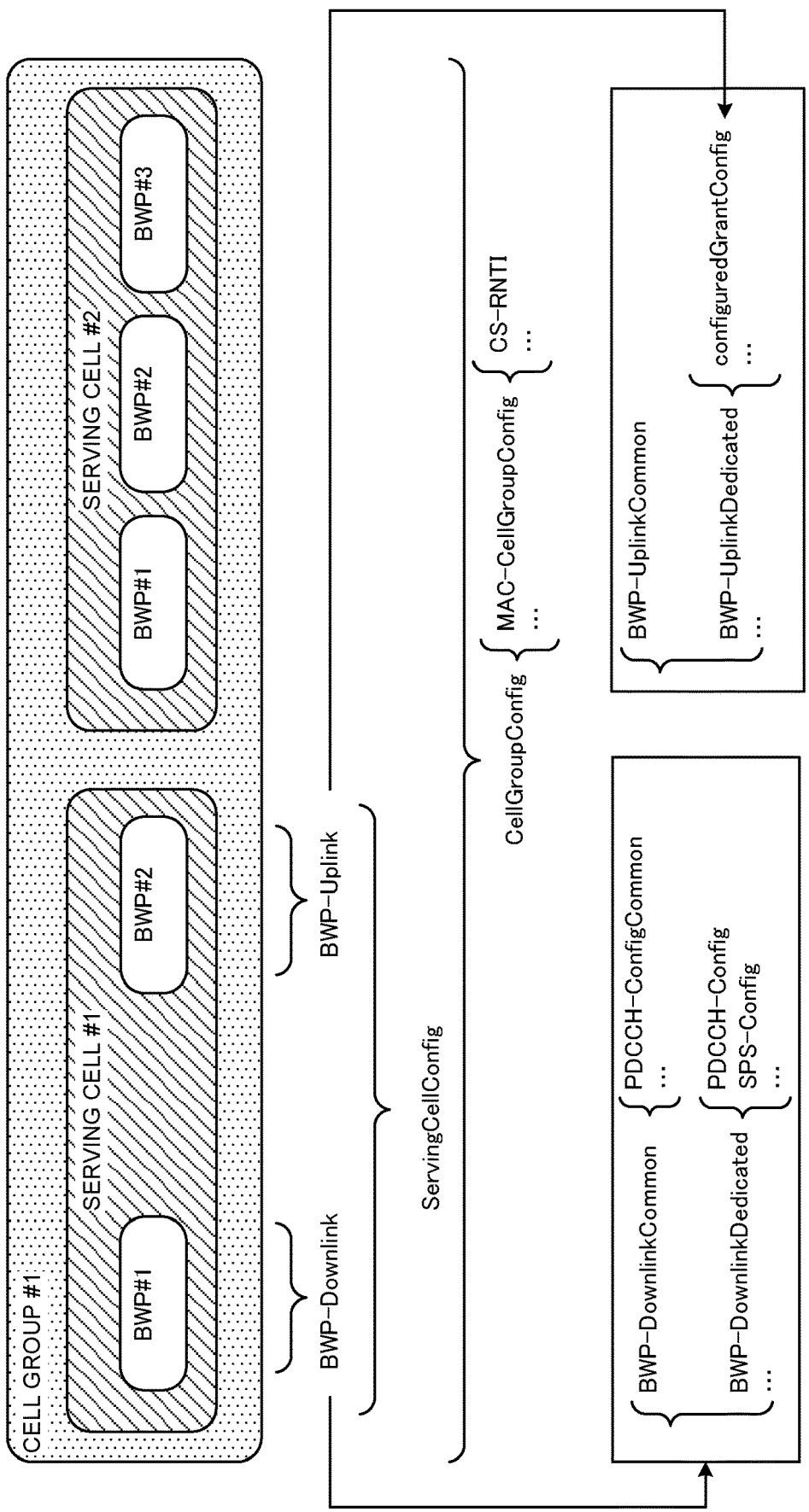
FIG. 1 is a diagram to show an example of an RRC structure for SPS and for a configured grant.

For the future radio communication systems (for example, NR, 5G, 5G+, or Rel. 15 or later versions), the use of a control resource set (CORESET) has been under study in order that a control signal of a physical layer (for example, downlink control information (DCI)) be transmitted from a radio base station (which may be referred to as, for example, a BS (Base Station), a transmission/reception point (TRP), an eNB (eNodeB), a gNB (NR NodeB), and so on) to a user terminal.

The CORESET is an allocation candidate region of a downlink control channel (for example, a PDCCH (Physical Downlink Control Channel)). The CORESET may include a certain frequency domain resource and time domain resource (for example, one or two OFDM symbols and so on). The PDCCH (or DCI) is mapped in each certain resource unit in the CORESET.

It is only necessary that the certain resource unit be, for example, at least one of a control channel element (CCE), a CCE group including one or more CCEs, a resource element group (REG) including one or more resource elements (REs), one or more REG bundles (REG groups), and a physical resource block (PRB).

The user terminal detects DCI for the user terminal by monitoring (performing blind decoding of) a search space (SS) in the CORESET. The search space may include a search space (common search space (CSS)) that is used for monitoring of DCI common to one or more user terminals (specific to each individual cell) and a search space (user-specific search space (USS)) that is used for monitoring of DCI specific to each individual user terminal.

The CSS may include at least one of the following.
Type 0-PDCCH CSS
Type 0A-PDCCH CSS
Type 1-PDCCH CSS
Type 2-PDCCH CSS
Type 3-PDCCH CSS Type 0-PDCCH CSS is also referred to as an SS for SIB1, an SS for RMSI (Remaining Minimum System Informatio), and so on. Type 0-PDCCH CSS may be a search space for DCI that is cyclic redundancy check (CRC)-scrambled by a certain identifier (for example, an SI-RNTI (System Information-Radio Network Temporary Identifier)) (a search space for monitoring of DCI for scheduling a downlink shared channel (PDSCH (Physical Downlink Shared Channel)) used to transmit SIB1).

Here, to "CRC-scramble" means to attach CRC bits that are scrambled (masked) with a certain identifier to DCI (to include such CRC bits in DCI).

Type 0A-PDCCH CSS is also referred to as an SS for OSI (Other System Information) and so on. Type 0A-PDCCH CSS may be a search space for DCI that is CRC-scrambled by a certain identifier (for example, an SI-RNTI) (a search space for monitoring of DCI for scheduling a PDSCH used to transmit OSI).

Type 1-PDCCH CSS is also referred to as an SS for random access (RA) and so on. Type 1-PDCCH CSS may be a search space for DCI that is CRC-scrambled by a certain identifier (for example, an RA-RNTI (Random Access-RNTI), a TC-RNTI (Temporary Cell-RNTI), or a C-RNTI (Cell-RNTI)) (a search space for monitoring of DCI for scheduling a PDSCH used to transmit a message for an RA procedure (for example, a random access response (message 2) or a message for contention resolution (message 4))).

Type 2-PDCCH CSS is also referred to as an SS for paging and so on. Type 2-PDCCH CSS may be a search space for DCI that is CRC-scrambled by a certain identifier (for example, a P-RNTI (Paging-RNTI)) (a search space for monitoring of DCI for scheduling a PDSCH used to transmit paging).

Type 3-PDCCH CSS may be a search space for DCI that is CRC-scrambled by a certain identifier (for example, an INT-RNTI (Interruption RNTI) for DL preemption indication, an SFI-RNTI for slot format indication (Slot Format Indicator RNTI), a TPC-PUSCH-RNTI for transmit power control (TPC) of a PUSCH (Physical Uplink Shared Channel), a TPC-PUCCH-RNTI for TPC of a PUCCH (Physical Uplink Control Channel), a TPC-SRS-RNTI for TPC of an SRS (Sounding Reference Signal), a C-RNTI, a CS-RNTI (Configured Scheduling RNTI), or an SP-CSI-RNTI (Semi-Persistent-CSI-RNTI)).

The USS may be a search space for DCI to which CRC bits that are CRC-scrambled by a certain identifier (for example, a C-RNTI, a CS-RNTI, or an SP-CSI-RNTI) are attached (DCI that includes such CRC bits).

Incidentally, in the existing LTE systems (for example, LTE Rel. 8 to Rel. 14), the CSS is provided in a primary cell (PCell), and is not provided in a secondary cell (SCell). In contrast, in the future radio communication systems, it is also assumed that the CSS is provided in the SCell as well as in the PCell. For this reason, how to control monitoring of DCI in a search space configured in the cells of each cell group is a problem.

For example, it is assumed that the user terminal monitors DCI CRC-scrambled by an SI-RNTI or a P-RNTI only in the PCell. Specifically, Type 0/0A/2-PDCCH CSS) described above need not be provided in a primary secondary cell (PSCell) and the SCell.

It is assumed that the user terminal monitors DCI CRC-scrambled by an RA-RNTI, a TC-RNTI, and a C-RNTI in the PCell (or the PCell and the PSCell). Specifically, Type 1-PDCCH CSS need not be provided in the SCell.

However, how the user terminal monitors DCI CRC-scrambled by a CS-RNTI is not defined in a specification. Accordingly, the user terminal may not be able to appropriately detect the DCI CRC-scrambled by a CS-RNTI.

Here, the CS-RNTI is used for control of at least one of downlink transmission and uplink transmission without dynamic scheduling. The downlink transmission is also referred to as semi-persistent scheduling (SPS), semi-persistent transmission, downlink SPS, and so on. The uplink transmission is also referred to as a configured grant, an uplink configured grant, and so on.

In SPS, at least one of activation, deactivation, and retransmission of PDSCH transmission of certain periodicity may be controlled by using the DCI CRC-scrambled by a CS-RNTI.

In the configured grant, at least one of activation, deactivation, and retransmission of PUSCH transmission of certain periodicity may be controlled by using the DCI CRC-scrambled by a CS-RNTI.

FIG. 1 is a diagram to show an example of an RRC (Radio Resource Control) structure for SPS and for a configured grant. FIG. 1 shows a structure of RRC parameters in a case in which a cell group including one or more cells (serving cells) is configured for the user terminal and one or more bandwidth parts (BWPs) are configured for each of the serving cells.

Here, the BWP is a partial band in a carrier (also referred to as a serving cell, a cell, a component carrier (CC), and so on). The BWP may include a BWP for DL (DL BWP) and a BWP for UL (UL BWP). Note that FIG. 1 is merely illustrative, and the number of serving cells in one cell group, the number of BWPs in each serving cell, a transmission direction of each BWP, and so on are not limited to those shown in the figure.

As shown in FIG. 1, configuration information of each cell group (also referred to as CellGroupConfig and so on) is reported to the user terminal. CellGroupConfig is used for configuration of a master cell group (MCG) or a secondary cell group (SCG). The MCG includes the PCell, and may include one or more SCells. The SCG includes the PSCell, and may include one or more SCells. Each cell group may include a single MAC (Medium Access Control) entity.

Communication using the MCG and the SCG is also referred to as dual connectivity (DC). Communication using a single cell group (for example, the MCG) is also referred to as carrier aggregation (CA) and so on.

As shown in FIG. 1, CellGroupConfig is reported for each cell group. CellGroupConfig may include configuration information of a MAC parameter applied to one entire cell group (also referred to as MAC-CellGroupConfig and so on). MAC-CellGroupConfig may include information related to the CS-RNTI (also referred to as CS-RNTI information, cs-RNTI, and so on). For example, cs-RNTI may indicate a value of the CS-RNTI configured for the user terminal for each cell group.

CellGroupConfig may include configuration information of each serving cell in one cell group (also referred to as ServingCellConfig and so on). For example, in FIG. 1, CellGroupConfig may include two ServingCellConfigs corresponding to respective serving cells #1 and #2.

Each ServingCellConfig may include at least one of configuration information of each DL BWP (BWP-Downlink) and configuration information of each UL BWP (BWP-Uplink) in each serving cell. For example, in FIG. 1, ServingCellConfig for serving cell #1 may include BWP-Downlink for BWP #1 and BWP-Uplink for BWP #2.

BWP-Downlink may include information related to the PDCCH specific to each individual cell (pdcch-ConfigCommon) and information related to the PDCCH specific to each individual user terminal (PDCCH-Config). For example, as shown in FIG. 1, pdcch-ConfigCommon may be included in a certain information element (IE) (for example, BWP-DownlinkCommon) in BWP-Downlink. PDCCH-Config may be included in a certain IE (for example, BWP-DownlinkDedicated) in BWP-Downlink.

pdcch-ConfigCommon may include information used for configuration of a certain number of CSSs (also referred to as commonSearchSpaces, SearchSpace, and so on). The certain number (for example, a maximum of four) CSSs may include at least one of Type 0-PDCCH CSS (SS for SIB1 or SS for RMSI), Type 0A-PDCCH CSS (SS for OSI), Type 1-PDCCH CSS (SS for RA), and Type 2-PDCCH CSS (SS for paging) that are described above.

pdcch-Config may include information indicating a certain number of SSs of each BWP of each cell (also referred to as searchSpacesToAddModList, SearchSpace, and so on). The certain number of SSs (for example, a maximum of 10 SSs) may include at least of one or more CSSs and one or more USSs.

BWP-Downlink may include configuration information related to SPS (downlink transmission without dynamic scheduling) (also referred to as SPS-Config and so on). Whether or not BWP-Downlink includes SPS-Config may determine whether or not SPS is configured in the DL BWP corresponding to the BWP-Downlink. For example, in FIG. 1, BWP-Downlink of BWP #1 includes SPS-Config, and thus SPS is configured in BWP #1. Note that FIG. 1 shows a case in which SPS is configured in each BWP. However, SPS may be configured in each serving cell.

BWP-Uplink may include configuration information related to a configured grant (uplink transmission without dynamic scheduling) (also referred to as ConfiguredGrant-Config and so on). Whether or not BWP-Uplink includes ConfiguredGrantConfig may determine whether or not a configured grant is configured in the UL BWP corresponding to the BWP-Uplink. For example, in FIG. 1, BWP-Uplink of BWP #2 includes ConfiguredGrantConfig, and thus a configured grant is configured in BWP #2. Note that FIG. 1 shows a case in which the configured grant is configured in each BWP. However, the configured grant may be configured in each serving cell.

As described above, when the CS-RNTI is configured for a cell group that is configured for the user terminal (when MAC-CellGroupConfig in CellGroupConfig includes cs-RNTI), which unit (at least one of a serving cell, a BWP, and a search space) in the cell group is used by the user terminal to monitor DCI CRC-scrambled by the CS-RNTI is a problem.

In the light of this, the inventors of the present invention came up with the idea of controlling monitoring of DCI CRC-scrambled by a certain identifier (for example, a CS-RNTI) included in configuration information (CellGroupConfig) of a cell group, based on at least one of which RRC parameter (for example, pdcch-ConfigCommon or pdcch-Config) is used to configure a search pace and a type of the search space (for example, a CSS or a USS), and arrived at the present invention.

The present embodiment will be described below in detail with reference to the drawings.

(First Aspect)

In the first aspect, when the CS-RNTI is configured for a cell group that is configured for the user terminal, the user terminal may monitor DCI CRC-scrambled by the CS-RNTI in at least one of the following search spaces:

One or more CSSs configured with pdcch-ConfigCommon in a PCell/PSCell;

CSS configured with pdcch-Config and in which monitoring with DCI formats 0_0 and 1_0 is configured in a PCell/PSCell and an SCell; and USS configured with pdcch-Config in a PCell/PSCell and an SCell.

Here, when a cell group in which the CS-RNTI is configured is an MCG, "PCell/PSCell" may indicate a PCell. When a cell group in which the CS-RNTI is configured is an SCG, "PCell/PSCell" may indicate a PSCell. DCI format 0_0 is DCI used for scheduling of a PUSCH. DCI format 1_0 is DCI used for scheduling of a PDSCH.

Figure 2:
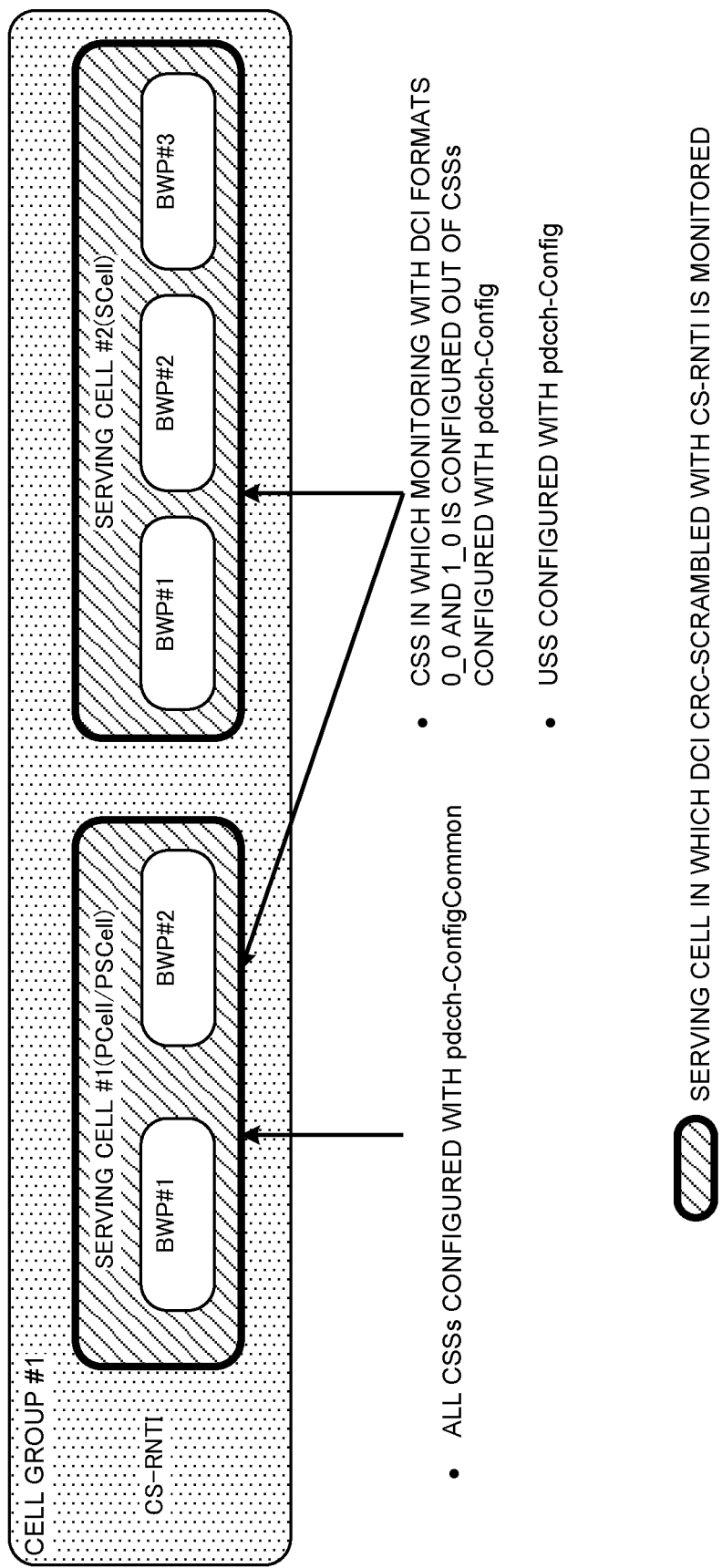
FIG. 2 is a diagram to show an example of monitoring control of DCI CRC-scrambled by a CS-RNTI according to a first aspect.

FIG. 2 is a diagram to show an example of monitoring control of DCI CRC-scrambled by a CS-RNTI according to the first aspect. FIG. 2 shows an example in which there is only single cell group #1. However, the number of cell groups configured for the user terminal is not limited to one. FIG. 2 assumes a case in which the CS-RNTI is configured in MAC-CellGroupConfig of CellGroupConfig of cell group #1. FIG. 2 also assumes a case in which cell group #1 includes serving cell #1 (PCell/PSCell) and serving cell #2 (SCell).

Note that FIG. 2 is merely illustrative, and the number of serving cells in the cell group, the number of BWPs in each serving cell, and so on are not limited to those shown in the figure. Although FIG. 2 assumes a case in which a single DL BWP and a single UL BWP are activated in each serving cell, it is only necessary that at least one of one or more DL BWPs and one or more UL BWPs be activated.

As shown in FIG. 2, the user terminal may monitor the DCI CRC-scrambled by the CS-RNTI in all the CSSs configured with pdcch-ConfigCommon in serving cell #1 (PCell/PSCell). Here, for example, "pdcch-ConfigCommon" may be pdcch-ConfigCommon in BWP-Downlink-Common of an activated BWP, may be pdcch-ConfigCommon in BWP-DownlinkCommon of a configured BWP, or may be pdcch-ConfigCommon in SIB1.

The user terminal may monitor the DCI CRC-scrambled by the CS-RNTI in the CSS configured with pdcch-Config and in which monitoring with DCI formats 0_0 and 1_0 is configured in both of serving cell #1 (PCell/PSCell) and the serving cell (SCell). Here, for example, "pdcch-Config" may be pdcch-Config in BWP-DownlinkDedicated of an activated BWP, or may be pdcch-Config in BWP-DownlinkDedicated of a configured BWP.

The user terminal may monitor the DCI CRC-scrambled by the CS-RNTI in the USS configured with pdcch-Config in both of serving cell #1 (PCell/PSCell) and the serving cell (SCell). The "pdcch-Config" is described as above.

In FIG. 2, in a case of the CSS configured with pdcch-Config and in which monitoring with DCI formats 0_0 and 1_0 is configured, the user terminal monitors the DCI CRC-scrambled by the CS-RNTI in the CSS not only when the CSS is configured in the PCell/PSCell but also when the CSS is configured in the SCell.

Modified Example

In the first aspect described above, the CSS configured with pdcch-Config and in which monitoring with DCI formats 0_0 and 1_0 is configured is monitored not only when the CSS is configured in the PCell/PSCell but also when the CSS is configured in the SCell. In contrast, in a modified example of the first aspect, the CSS may be monitored in the PCell/PSCell, and may not be monitored in the SCell.

Specifically, when the CS-RNTI is configured for a cell group that is configured for the user terminal (when MAC-CellGroupConfig of CellGroupConfig includes cs-RNTI), the user terminal may monitor DCI CRC-scrambled by the CS-RNTI in at least one of the following search spaces:
One or more CSSs configured with pdcch-ConfigCommon in a PCell/PSCell;
CSS configured with pdcch-Config and in which monitoring with DCI formats 0_0 and 1_0 is configured in a PCell/PSCell; and
USS configured with pdcch-Config in a PCell/PSCell and an SCell.

The user terminal may monitor DCI CRC-scrambled by a C-RNTI in the search space in which the DCI CRC-scrambled by the CS-RNTI is monitored.

FIG. 3 is a diagram to show an example of monitoring control of DCI CRC-scrambled by a CS-RNTI according to the modified example of the first aspect. With reference to FIG. 3, the difference from FIG. 2 will be mainly described. In FIG. 3, the user terminal may monitor the DCI CRC-scrambled by the CS-RNTI in the CSS configured with pdcch-Config and in which monitoring with DCI formats 0_0 and 1_0 is configured in serving cell #1 (PCell/PSCell).

As described above, FIG. 3 is different from FIG. 2 in that the user terminal does not monitor the DCI CRC-scrambled by the CS-RNTI in the CSS configured with pdcch-Config and in which monitoring with DCI formats 0_0 and 1_0 is configured in serving cell #2 (SCell).

In FIG. 3, the condition of monitoring the DCI CRC-scrambled by the CS-RNTI and the condition of monitoring the DCI CRC-scrambled by the C-RNTI are the same. Accordingly, operation related to monitoring (blind decoding) of the DCI in the user terminal can be facilitated.

As described above, in the first aspect, monitoring of the DCI CRC-scrambled by the CS-RNTI configured in a cell group is controlled based on at least one of an RRC parameter (for example, pdcch-ConfigCommon or pdcch-Config) that is used for configuration of a search space and a type of the search space (for example, a CSS or a USS). Accordingly, monitoring of the DCI CRC-scrambled by the CS-RNTI in the search space configured in a cell of the cell group can be appropriately controlled.

(Second Aspect)

As described with reference to FIG. 1, SPS-Config and configuredGrantConfig are configured for the user terminal in each BWP. In contrast, the CS-RNTI is configured for the user terminal in each cell group. Due to this configuration, under the condition of the first aspect, the user terminal may perform monitoring of DCI CRC-scrambled by a CS-RNTI even though SPS-Config or configuredGrantConfig is not configured in a certain serving cell (or BWP).

FIGS. 4A and 4B each show an example of a DL BWP and a serving cell in which DCI CRC-scrambled by a CS-RNTI is monitored even though neither SPS-Config nor configuredGrantConfig is configured. Note that, with reference to FIGS. 4A and 4B, the difference from FIGS. 2 and 3 will be mainly described.

For example, FIG. 4A assumes a case in which SPS-Config is configured in BWP #2 of serving cell #1 and configuredGrantConfig is configured in BWP #2 of serving cell #2. FIG. 4B assumes a case in which SPS-Config is configured in BWP #1 of serving cell #2 and configuredGrantConfig is configured in BWP #2 thereof.

In serving cell #1 of FIG. 4B, neither SPS-Config nor configuredGrantConfig is configured. At the same time, serving cell #1 is a PCell/PSCell. Thus, under the condition of the first aspect described above, the user terminal monitors at least one of all of the CSSs configured with pdcch-ConfigCommon, a CSS configured with pdcch-Config and in which monitoring with DCI formats 0_0 and 1_0 is configured, and a USS configured with pdcch-Config in serving cell #1.

In view of this, in the second aspect, the DCI CRC-scrambled by the CS-RNTI may be monitored in a serving cell having a specific BWP in which SPS-Config or configuredGrantConfig is configured. The specific BWP may be, for example, a BWP in an active state (active BWP).

Specifically, the user terminal may monitor the DCI CRC-scrambled by the CS-RNTI in at least one of the following search spaces:
All CSSs configured with pdcch-ConfigCommon if an active BWP of a serving cell includes SPS-Config or configuredGrantConfig in a PCell/PSCell;
CSS configured with pdcch-Config and in which monitoring with DCI formats 0_0 and 1_0 is configured if an active BWP of a serving cell includes SPS-Config or configuredGrantConfig in a PCell/PSCell and an SCell; and
USS configured with pdcch-Config if an active BWP of a serving cell includes SPS-Config or configuredGrantConfig in a PCell/PSCell and an SCell.

FIGS. 5A and 5B are each a diagram to show an example of monitoring control of DCI CRC-scrambled by a CS-RNTI according to the second aspect. Note that, although FIGS. 5A and 5B each assume a case in which BWP #2 of serving cell #1 (PCell/PSCell) is in an active state and BWP #1 of serving cell #2 (SCell) is in an active state, it goes without saying that the present invention is not limited to the case. With reference to FIGS. 5A and 5B, the difference from FIGS. 4A and 4B will be mainly described.

In FIG. 5A, SPS-Config is configured in active BWP #2 of serving cell #1 (PCell/PSCell). In contrast, neither configuredGrantConfig nor SPS-Config is configured in active BWP #1 of serving cell #2 (SCell).

In FIG. 5A, SPS-Config is configured in active BWP #2 of serving cell #1 (PCell/PSCell), and thus the user terminal may monitor the DCI CRC-scrambled by the CS-RNTI in all of the CSSs configured with pdcch-ConfigCommon in serving cell #1.

In FIG. 5A, SPS-Config is configured in active BWP #2 of serving cell #1 (PCell/PSCell), and thus the user terminal may monitor the DCI CRC-scrambled by the CS-RNTI in the CSS configured with pdcch-Config and in which monitoring with DCI formats 0_0 and 1_0 is configured in serving cell #1.

In a similar manner, in FIG. 5A, SPS-Config is configured in active BWP #2 of serving cell #1 (PCell/PSCell), and thus the user terminal may monitor the DCI CRC-scrambled by the CS-RNTI in the USS configured with pdcch-Config in serving cell #1.

In contrast, in FIG. 5A, neither SPS-Config nor configuredGrantConfig is configured in active BWP #1 of serving cell #2 (SCell), and thus the user terminal need not monitor the DCI CRC-scrambled by the CS-RNTI in the CSS configured with pdcch-Config and in which monitoring with DCI formats 0_0 and 1_0 is configured in serving cell #2.

In a similar manner, in FIG. 5A, neither SPS-Config nor configuredGrantConfig is configured in active BWP #1 of serving cell #2 (SCell), and thus the user terminal need not monitor the DCI CRC-scrambled by the CS-RNTI in the USS configured with pdcch-Config in serving cell #2.

In contrast, in FIG. 5B, neither SPS-Config nor configuredGrantConfig is configured in active BWP #2 of serving cell #1 (PCell/PSCell). SPS-Config is configured in active BWP #1 of serving cell #2 (SCell).

In FIG. 5B, neither SPS-Config nor configuredGrantConfig is configured in active BWP #2 of serving cell #1 (PCell/PSCell), and thus the user terminal need not monitor the DCI CRC-scrambled by the CS-RNTI in any of the CSSs in serving cell #1.

In contrast, in FIG. 5B, SPS-Config is configured in active BWP #1 of serving cell #2 (SCell), and thus the user terminal may monitor the DCI CRC-scrambled by the CS-RNTI in the CSS configured with pdcch-Config and in which monitoring with DCI formats 0_0 and 1_0 is configured in serving cell #2.

In a similar manner, in FIG. 5B, SPS-Config is configured in active BWP #1 of serving cell #2 (SCell), and thus the user terminal may monitor the DCI CRC-scrambled by the CS-RNTI in the USS configured with pdcch-Config in serving cell #2.

Modified Example

The second aspect described above has provided a description of a case in which the CSS configured with pdcch-Config and in which monitoring with DCI formats 0_0 and 1_0 is configured if the active BWP of the serving cell includes SPS-Config or configuredGrantConfig is not only configured in the PCell/PSCell but is also configured in the SCell. In a modified example of the second aspect, the CSS may be monitored in the PCell/PSCell, and may not be started in the SCell.

Specifically, when the CS-RNTI is configured for a cell group that is configured for the user terminal (when MAC-CellGroupConfig of CellGroupConfig includes cs-RNTI), the user terminal may monitor DCI CRC-scrambled by the CS-RNTI in at least one of the following search spaces:

One or more CSSs configured with pdcch-ConfigCommon if an active BWP of a serving cell includes SPS-Config or configuredGrantConfig in a PCell/PSCell;

CSS configured with pdcch-Config and in which monitoring with DCI formats 0_0 and 1_0 is configured if an active BWP of a serving cell includes SPS-Config or configuredGrantConfig in a PCell/PSCell; and USS configured with pdcch-Config if an active BWP of a serving cell includes SPS-Config or configuredGrantConfig in a PCell/PSCell and an SCell.

In the second aspect, the user terminal can prevent the DCI CRC-scrambled by the CS-RNTI from being monitored in the serving cell in which neither SPS-Config nor configuredGrantConfig is configured. As a result, a processing load related to monitoring of the DCI can be reduced in comparison to that in the first aspect.

(Third Aspect)

The second aspect specifies that, when an active BWP of a serving cell includes neither SPS-Config nor configuredGrantConfig, the user terminal need not monitor the DCI CRC-scrambled by the CS-RNTI in any of the CSSs.

In contrast, in the third aspect, when an active BWP of a serving cell (at least one of a DL BWP and an UL BWP in an active state) includes neither SPS-Config nor configuredGrantConfig, whether or not the user terminal monitors the DCI CRC-scrambled by the CS-RNTI in a search space that satisfies the condition described in the first aspect and the modified example of the first aspect described above may depend on implementation of the user terminal.

Alternatively, in the third aspect, when the serving cell includes neither SPS-Config nor configuredGrantConfig, whether or not the user terminal monitors the DCI CRC-scrambled by the CS-RNTI in a search space that satisfies the condition described in the first aspect and the modified example of the first aspect described above may depend on implementation of the user terminal.

However, in the serving cell or the active BWP in which neither SPS-Config nor configuredGrantConfig is provided, the user terminal need not expect reception of a PDSCH using SPS or transmission of a PUSCH using a configured grant.

In the third aspect, monitoring of the DCI CRC-scrambled by the CS-RNTI can be more flexibly controlled, depending on implementation of the user terminal.

(Fourth Aspect)

The fourth aspect will provide a description of control of at least one of activation and deactivation (activation/deactivation) of at least one of SPS and a configured grant (SPS/configured grant) of a cross-carrier using the DCI CRC-scrambled by the CS-RNTI.

In the fourth aspect, activation/deactivation of SPS/configured grant of a cross-carrier (of a different cell) using DCI that is CRC-scrambled by the CS-RNTI and that includes a carrier indicator field (CIF) (for example, at least one of DCI formats 0_1 and 1_1 (DCI format 0_1/1_1)) may be supported.

Here, the CIF is a certain field (first field) that indicates a cell (a serving cell or a carrier) in which a PDSCH or a PUSCH is scheduled.

In the fourth aspect, activation/deactivation of SPS/configured grant in the same cell using DCI that is CRC-scrambled by the CS-RNTI and that does not include the CIF (for example, at least one of DCI formats 0_0 and 1_0 (DCI format 0_0/1_0)) may be supported.

Here, DCI format 0_0/0_1 scrambled by the CS-RNTI may be used for control of at least one of activation, deactivation, and retransmission of the PUSCH of the configured grant. In contrast, DCI format 1_0/1_1 scrambled by the CS-RNTI may be used for control of at least one of activation, deactivation, and retransmission of the PDSCH of the SPS.

DCI format 0_1/1_1 scrambled by the CS-RNTI may control activation/deactivation of SPS/configured grant of a serving cell specified by the CIF in the DCI format 0_1/1_1. In this case, cross-carrier scheduling may be applied to the user terminal.

Figure 6:
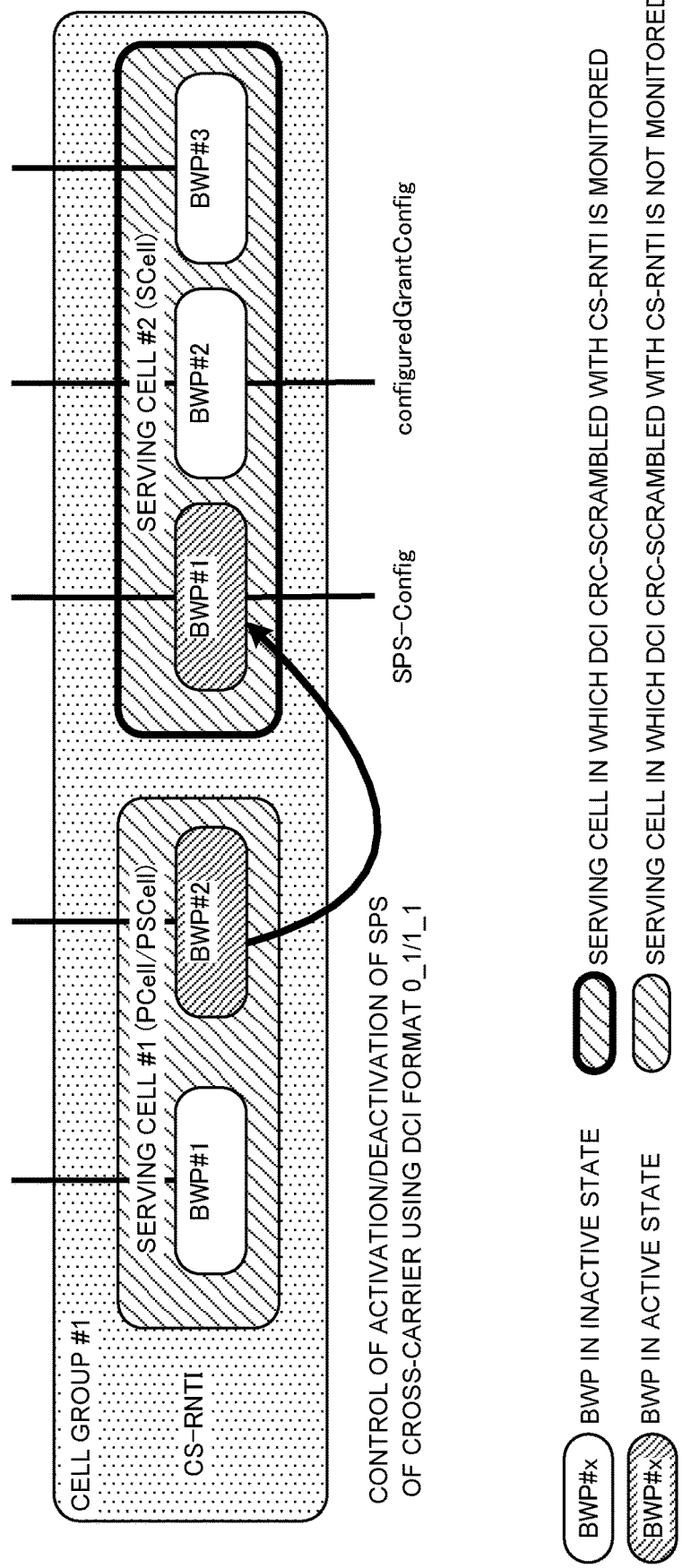
FIG. 6 is a diagram to show an example of control of activation/deactivation of SPS/configured grant according to a fourth aspect.

FIG. 6 is a diagram to show an example of control of activation/deactivation of SPS/configured grant according to the fourth aspect. As shown in FIG. 6, the user terminal may control activation/deactivation of SPS/configured grant of a carrier (here, serving cell #2) specified by the CIF of DCI format 0_1/1_1 that is detected by using the CS-RNTI in serving cell #1, based on the DCI format 0_1/1_1.

As shown in FIG. 6, control of activation/deactivation of SPS/configured grant of a cross-carrier using DCI format 0_1/1_1 including the CIF is preferable for the second or third aspect described above. In contrast, control of activation/deactivation of SPS/configured grant in the same cell using DCI format 0_0/1_0 not including the CIF is preferable for the first aspect described above. In this manner, in the fourth aspect, at least one of the first to third aspects can be combined.

The fourth aspect enables control of activation/deactivation of SPS/configured grant of a cross-carrier or in the same cell using the DCI CRC-scrambled by the CS-RNTI.
(Fifth Aspect)

The fifth aspect will provide a description of control of activation/deactivation of SPS/configured grant of a cross-BWP using the DCI CRC-scrambled by the CS-RNTI. In the fifth aspect, the difference from the fourth aspect will be mainly described.

In the fifth aspect, activation/deactivation of SPS/configured grant of a cross-BWP (of a different BWP) using DCI that is CRC-scrambled by the CS-RNTI and that includes a bandwidth part indicator field (BI) (for example, at least one of DCI formats 0_1 and 1_1 (DCI format 0_1/1_1)) may be supported.

Here, the BI field is a certain field (second field) that indicates a BWP in which a PDSCH or a PUSCH is scheduled.

In the fifth aspect, activation/deactivation of SPS/configured grant in the same BWP (a given active BWP) using DCI that is CRC-scrambled by the CS-RNTI and that does not include the BI field (for example, at least one of DCI formats 0_0 and 1_0 (DCI format 0_0/1_0)) may be supported.

DCI format 0_1/1_1 scrambled by the CS-RNTI may control activation/deactivation of SPS/configured grant of a BWP specified by the BI field in the DCI format 0_1/1_1. In this case, dynamic BWP activation may be applied to the user terminal.

Figure 7:
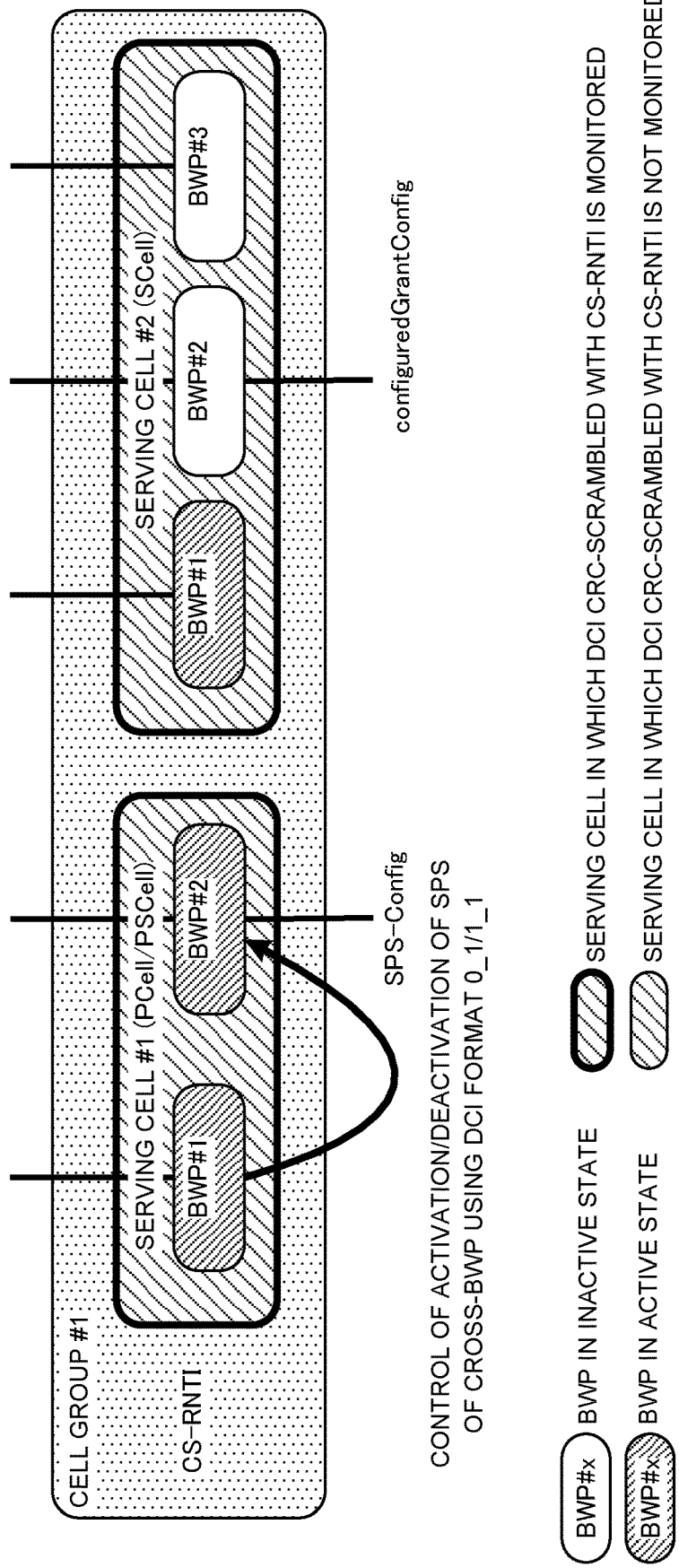
FIG. 7 is a diagram to show an example of control of activation/deactivation of SPS/configured grant according to a fifth aspect.

FIG. 7 is a diagram to show an example of control of activation/deactivation of SPS/configured grant according to the fifth aspect. As shown in FIG. 7, the user terminal may control activation/deactivation of SPS/configured grant of a BWP (here, BWP #2 of serving cell #1) specified by the BI field of DCI format 0_1/1_1 that is detected by using the CS-RNTI in BWP #1 of serving cell #1, based on the DCI format 0_1/1_1.

As shown in FIG. 7, control of activation/deactivation of SPS/configured grant of a cross-BWP using DCI format 0_1/1_1 including the BI field is preferable for the first aspect described above. In contrast, control of activation/deactivation of SPS/configured grant in the same BWP using DCI format 0_0/1_0 not including the BI field is preferable for the second or third aspect described above. In this manner, in the fifth aspect, at least one of the first to fourth aspects can be combined.

The fifth aspect enables control of activation/deactivation of SPS/configured grant of a cross-BWP or in the same BWP using the DCI CRC-scrambled by the CS-RNTI.
(Sixth Aspect)

In the sixth aspect, when the CSS of the SCell is used for activation/deactivation of SPS/configured grant, resource allocation for SPS/configured grant to be activated using DCI that is detected in the CSS of the SCell may be limited to one or more resource blocks (RBs) in a CORESET in which the DCI is received.

Figure 8:
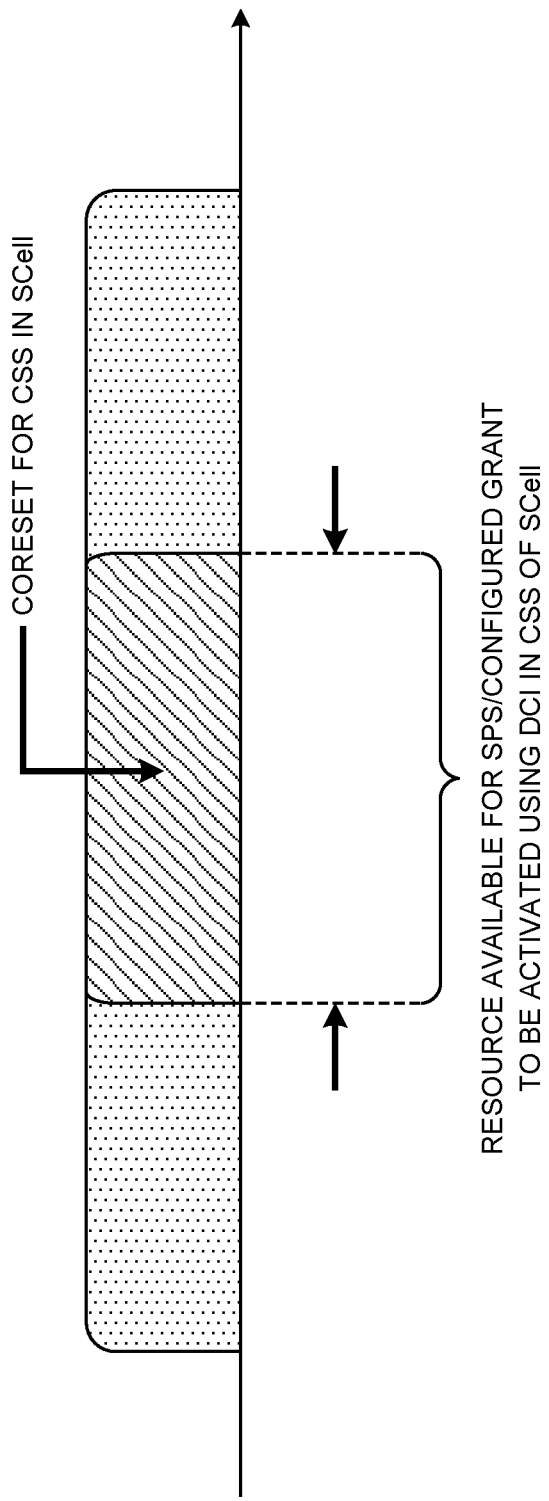
FIG. 8 is a diagram to show an example of resource allocation for SPS/configured grant according to a sixth aspect.

FIG. 8 is a diagram to show an example of resource allocation for SPS/configured grant according to the sixth aspect. As shown in FIG. 8, allocation resource for SPS/configured grant to be activated using the DCI CRC-scrambled by the CS-RNTI in the CSS in the SCell may be at least a part of RBs that constitute the CORESET in which the DCI is detected.
(Other Aspects)

The CSS for an SCell may be configured with pdcch-Config. When configuration information (SearchSpace IE) of a search space configured using pdcch-Config includes type information (SearchSpaceType) indicating a CSS, monitoring using at least one of DCI formats 0_0, 1_0, 2_0, 2_1, 2_2, and 2_3 may be configured in the search space (CSS). In the CSS, DCI CRC-scrambled by at least one of a C-RNTI, a CS-RNTI, an IN-RNTI, a TPC-PUSCH-RNTI, a TPC-PUCCH-RNTI, and a TPC-SRS-RNTI may be transmitted.

The CSS for an SCell may be configured with pdcch-ConfigCommon. In a search space configured using pdcch-ConfigCommon, the user terminal may monitor DCI formats 0_0 and 1_0 scrambled by a C-RNTI (if the C-RNTI is allocated) or with a CS-RNTI (if the CS-RNTI is configured).

Such CSS for an SCell as described above may be used for a PDCCH common to one or more user terminals (group common PDCCH) and so on.
(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 9:
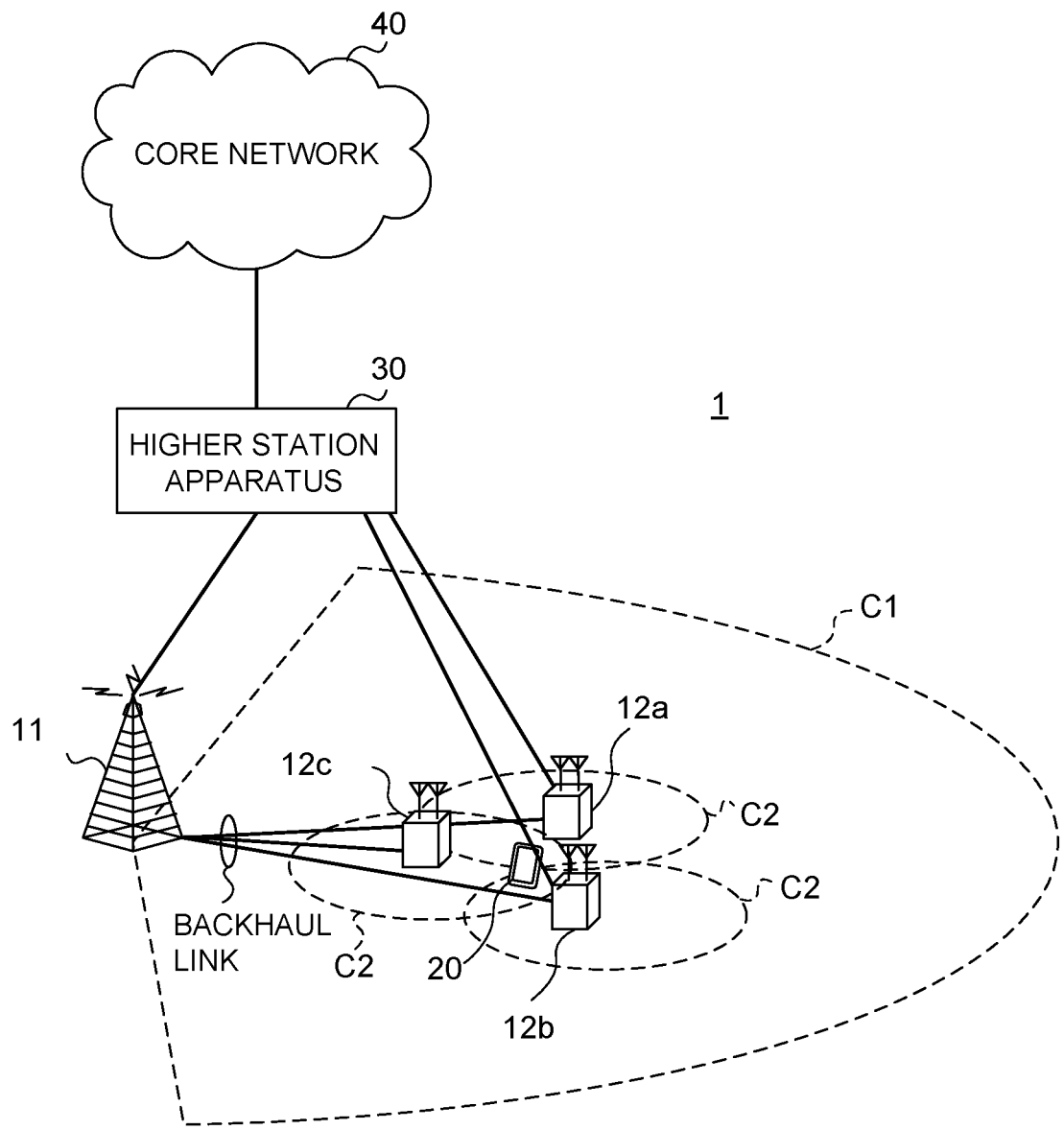
FIG. 9 is a diagram to show an example of a schematic structure of a radio communication system according to the present embodiment.

FIG. 9 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 10:
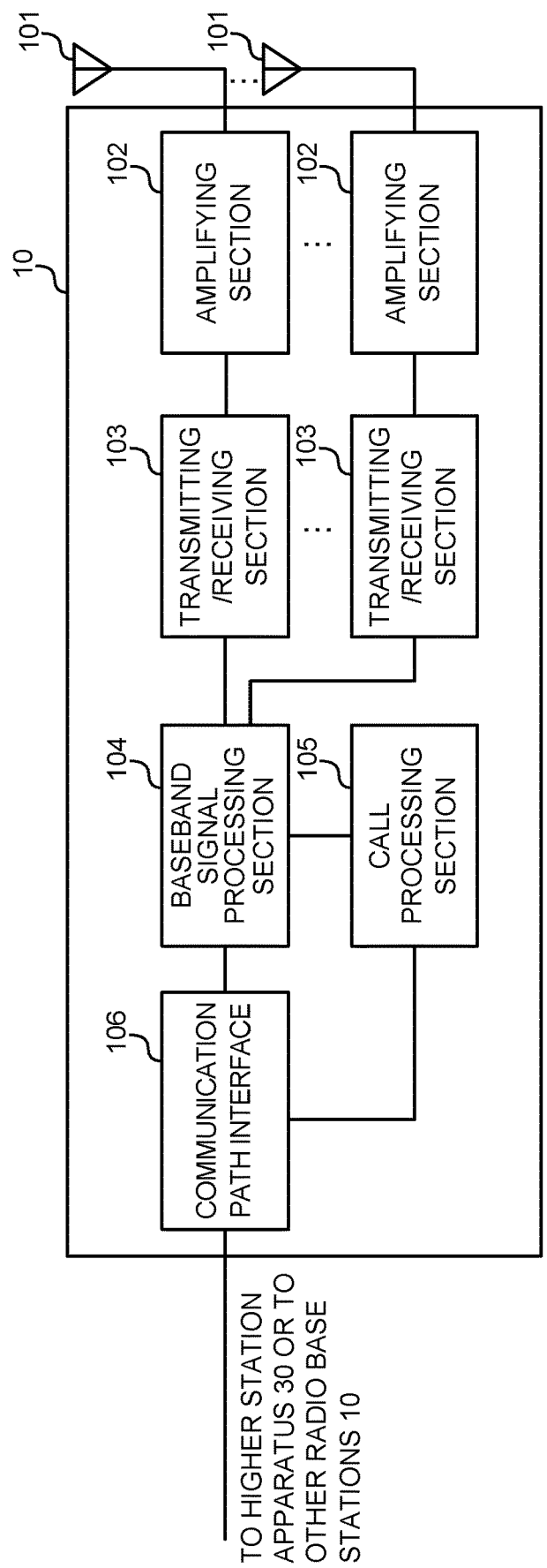
FIG. 10 is a diagram to show an example of an overall structure of a radio base station according to the present embodiment.

FIG. 10 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Each of the transmitting/receiving sections 103 transmits configuration information of at least one of a cell group, a cell, a BWP, a CORESET, and a search space. Each of the transmitting/receiving sections 103 transmits DCI.

Figure 11:
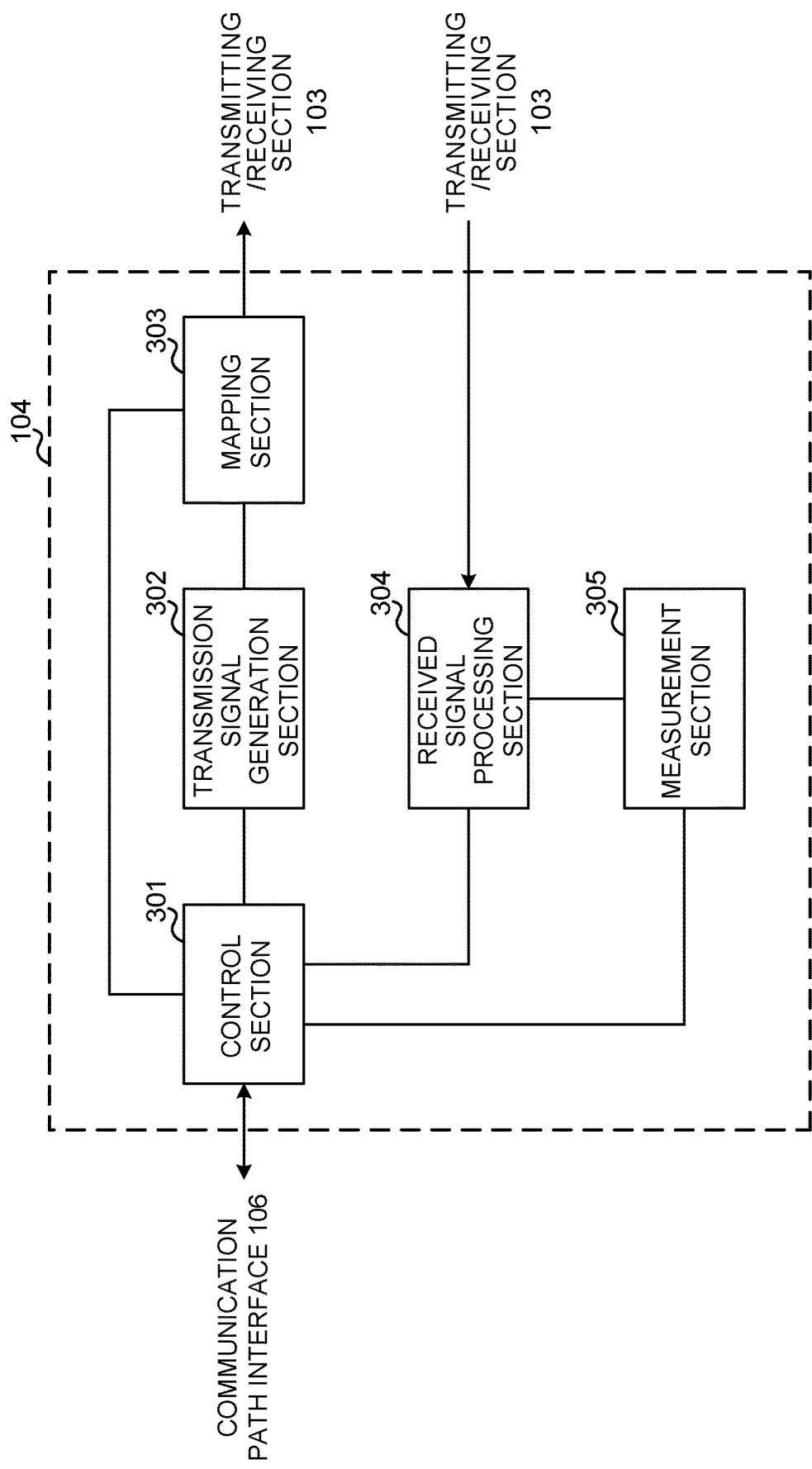
FIG. 11 is a diagram to show an example of a functional structure of the radio base station according to the present embodiment.

FIG. 11 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 may perform control of transmitting DCI by using a CORESET. The control section 301 may perform control of generating DCI by using a specific DCI format and an RNTI corresponding to the format and transmitting the generated DCI in a specific search space.

The control section 301 may control configuration of at least one of a cell group, a cell, a BWP, a CORESET, and a search space, and control transmission of configuration information of at least one of these.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 12:
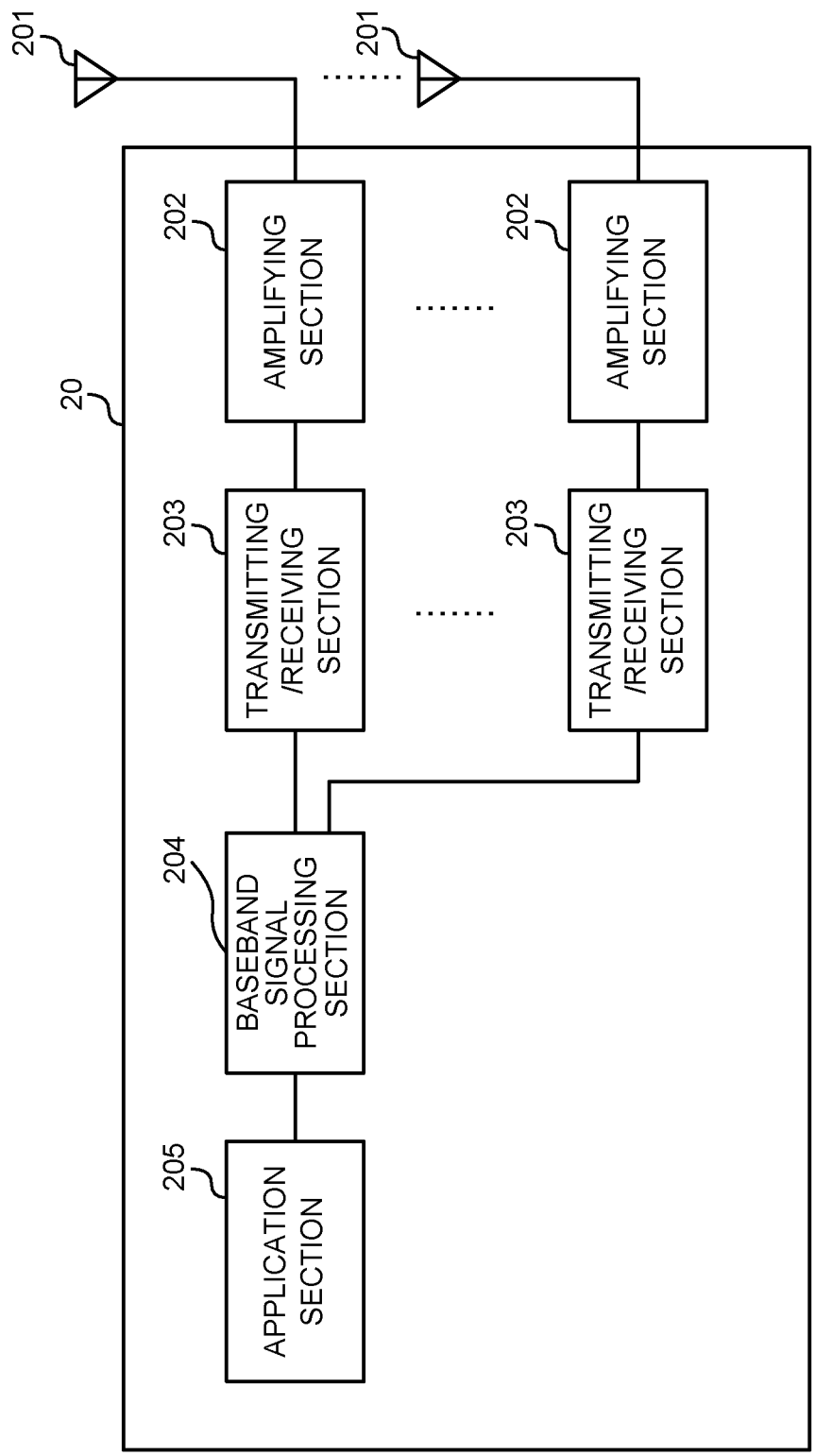
FIG. 12 is a diagram to show an example of an overall structure of a user terminal according to the present embodiment.

FIG. 12 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Each of the transmitting/receiving sections 103 transmits configuration information of at least one of a cell group, a cell, a BWP, a CORESET, and a search space. Each of the transmitting/receiving sections 103 transmits DCI.

Figure 13:
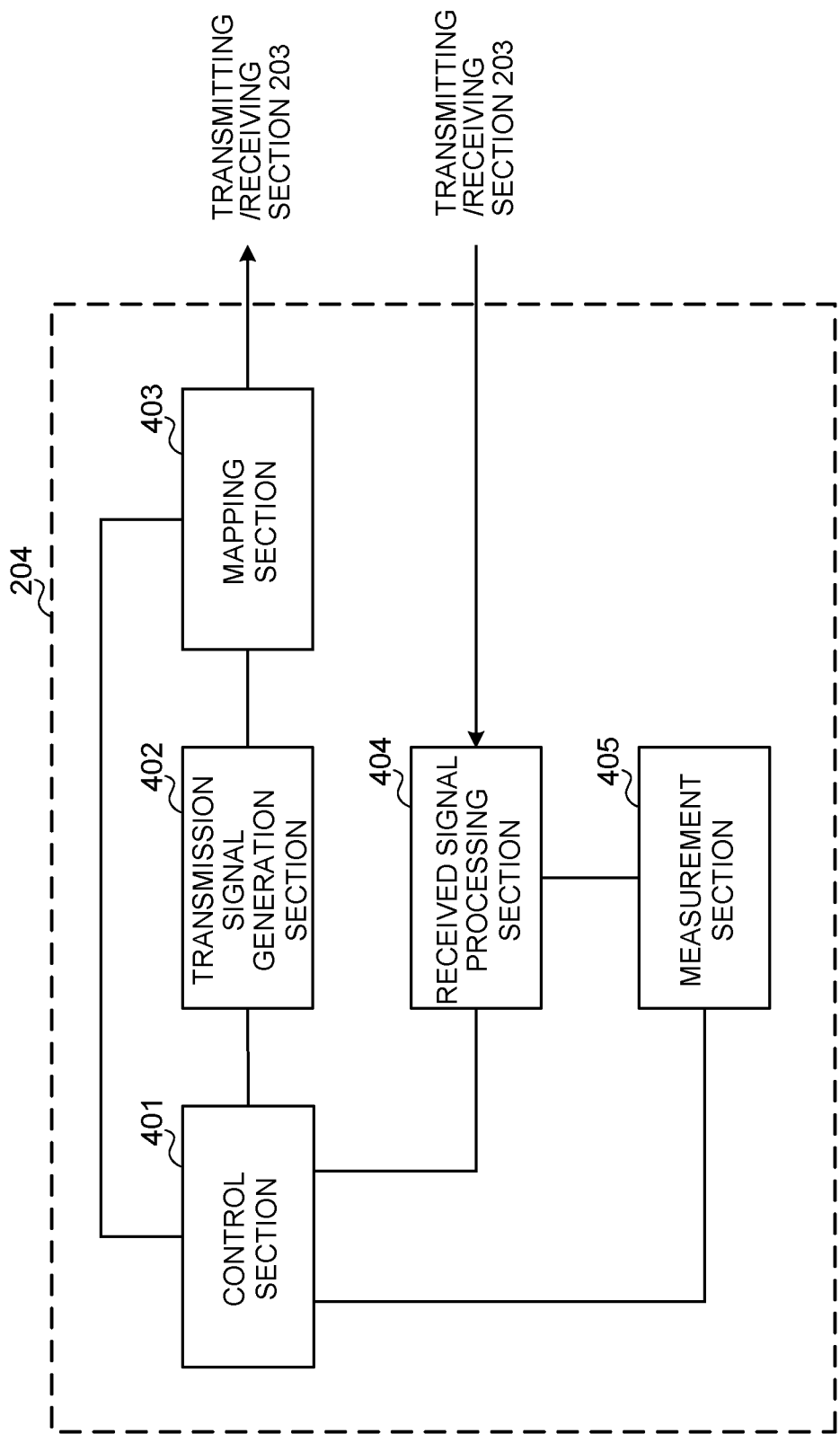
FIG. 13 is a diagram to show an example of a functional structure of the user terminal according to the present embodiment.

FIG. 13 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may control monitoring of DCI CRC-scrambled by a certain identifier (for example, at least one of a C-RNTI, a CS-RNTI, an SI-RNTI, a P-RNTI, an RA-RNTI, a TC-RNTI, an INT-RNTI, an SFI-RNTI, a TPC-PUSCH-RNTI, a TPC-PUCCH-RNTI, a TPC-SRS-RNTI, and an SP-CSI-RNTI).

The control section 401 may control monitoring of DCI including CRC bits scrambled by a certain identifier (for example, a CS-RNTI) included in configuration information of a cell group in a search space configured in a cell in the cell group.

The search space may be at least one of a common search space configured based on information related to a cell-specific downlink control channel in a primary cell (P cell) or a primary secondary cell (PS cell) in the cell group, a common search space and a user terminal-specific search space configured based on information related to a user terminal-specific downlink control channel in the P cell or the PS cell and a secondary cell (S cell) in the cell group, and a common search space configured based on information related to the user terminal-specific downlink control channel in the P cell or the PS cell.

When downlink or uplink transmission without dynamic scheduling is configured for a bandwidth part in an active state in the cell in the cell group, the control section 401 may control monitoring of the downlink control information in the search space.

The DCI may include a first field (for example, a CIF) indicating a cell in which a downlink shared channel or an uplink shared channel is scheduled. The control section 401 may control activation or deactivation of downlink or uplink transmission without dynamic scheduling in the cell indicated by the first field, based on the DCI.

The DCI may include a second field (for example, a BI field) indicating a bandwidth part in which a downlink shared channel or an uplink shared channel is scheduled. The control section 401 may control activation or deactivation of downlink or uplink transmission without dynamic scheduling in the bandwidth part indicated by the second field, based on the DCI.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 14:
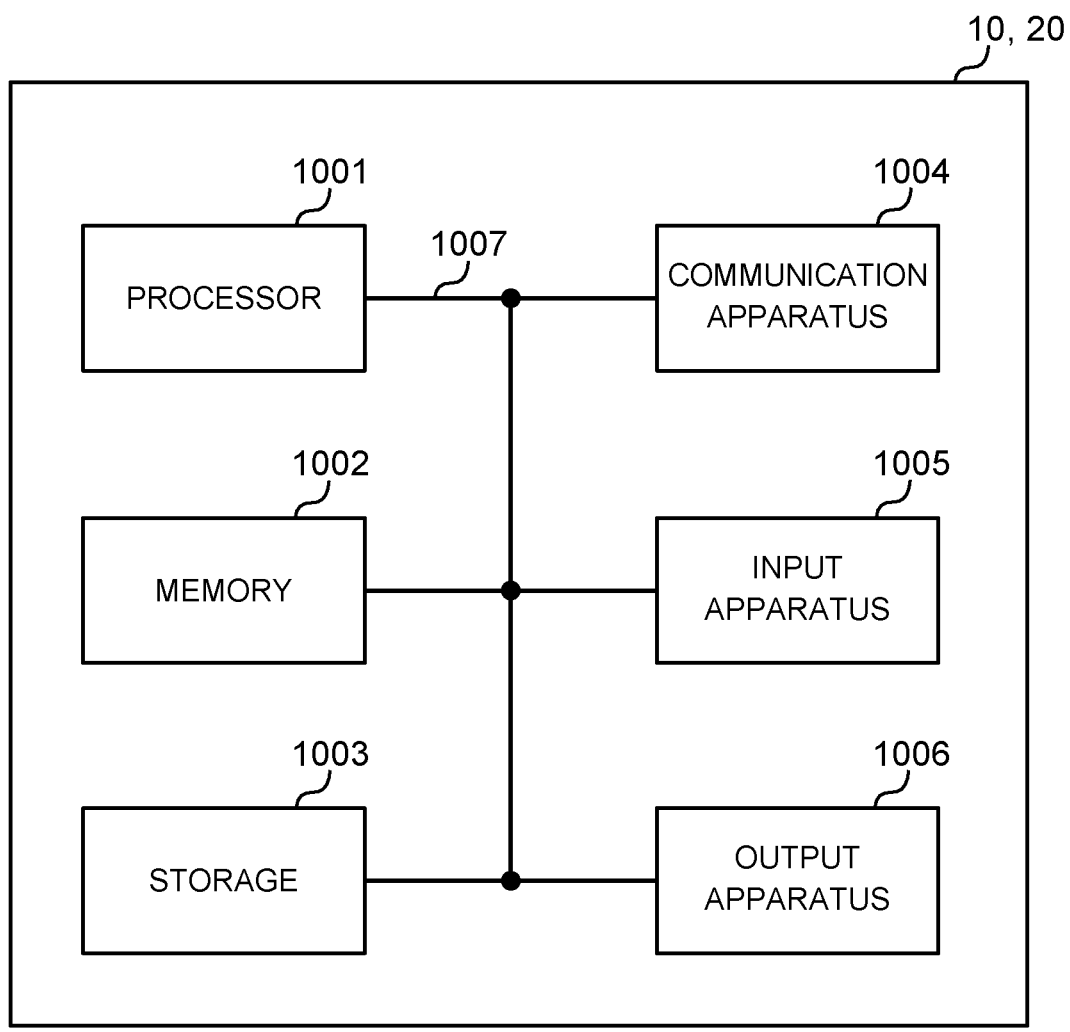
FIG. 14 is a diagram to show an example of a hardware structure of the radio base station and the user terminal according to the present embodiment.

For example, a radio base station, a user terminal, and so on according to the present embodiment of the present disclosure may function as a computer that executes the processes of the radio communication method of the present disclosure. FIG. 14 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "reception point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

The invention claimed is:

1. A terminal comprising:
   a receiver that receives a configured scheduling-radio network temporary identifier (CS-RNTI), and configuration information of a physical downlink control channel (PDCCH), as radio resource control (RRC) parameters, for downlink semi-persistent scheduling (SPS) and an uplink configured grant, the CS-RNTI being independently configured per cell group; and
   a processor that controls monitoring of a downlink control information (DCI) including cyclic redundancy check (CRC) bits scrambled by the CS-RNTI in a common search space,
   wherein the common search space is configured based on the configuration information in a primary cell.

2. The terminal according to claim 1, wherein the DCI includes a first field indicating a carrier in which a downlink shared channel or an uplink shared channel is scheduled, and
   wherein the processor controls, based on the DCI, an activation or a deactivation of semi-persistent scheduling in the carrier or a configured grant in the carrier.

3. The terminal according to claim 1, wherein the DCI includes a second field indicating a bandwidth part in which a downlink shared channel or an uplink shared channel is scheduled, and
   wherein the processor controls, based on the DCI, an activation or a deactivation of semi-persistent scheduling in the bandwidth part or a configured grant in the bandwidth part.

4. A radio communication method for a terminal comprising:
   receiving a configured scheduling-radio network temporary identifier (CS-RNTI), and configuration information of a physical downlink control channel (PDCCH), as radio resource control (RRC) parameters, for downlink semi-persistent scheduling (SPS) and an uplink configured grant, the CS-RNTI being independently configured per cell group; and
   monitoring a downlink control information (DCI) including cyclic redundancy check (CRC) bits scrambled by the CS-RNTI in a common search space,
   wherein the common search space is configured based on the configuration information in a primary cell.

5. A base station comprising:
   a transmitter that transmits a configured scheduling-radio network temporary identifier (CS-RNTI), and configuration information of a physical downlink control channel (PDCCH), as radio resource control (RRC) parameters, for downlink semi-persistent scheduling (SPS) and an uplink configured grant, the CS-RNTI being independently configured per cell group,
   wherein the transmitter transmits a downlink control information (DCI) including cyclic redundancy check (CRC) bits scrambled by the CS-RNTI in a common search space, and
   wherein the common search space is configured based on the configuration information in a primary cell.

6. A system comprising a base station and a terminal, wherein:
the base station comprises:
a transmitter that transmits a configured scheduling-radio network temporary identifier (CS-RNTI), and configuration information of a physical downlink control channel (PDCCH), as radio resource control (RRC) parameters, for downlink semi-persistent scheduling (SPS) and an uplink configured grant, the CS-RNTI being independently configured per cell group, and
the terminal comprises:
a receiver that receives the CS-RNTI; and
a processor that controls monitoring of a downlink control information (DCI) including cyclic redundancy check (CRC) bits scrambled by the CS-RNTI in a common search space,
wherein the common search space is configured based on the configuration information in a primary cell.

* * * * *